Aug. 31, 1965  P. C. LEHNIG, JR  3,203,232
TESTING MACHINES
Filed Feb. 8, 1963  3 Sheets-Sheet 2
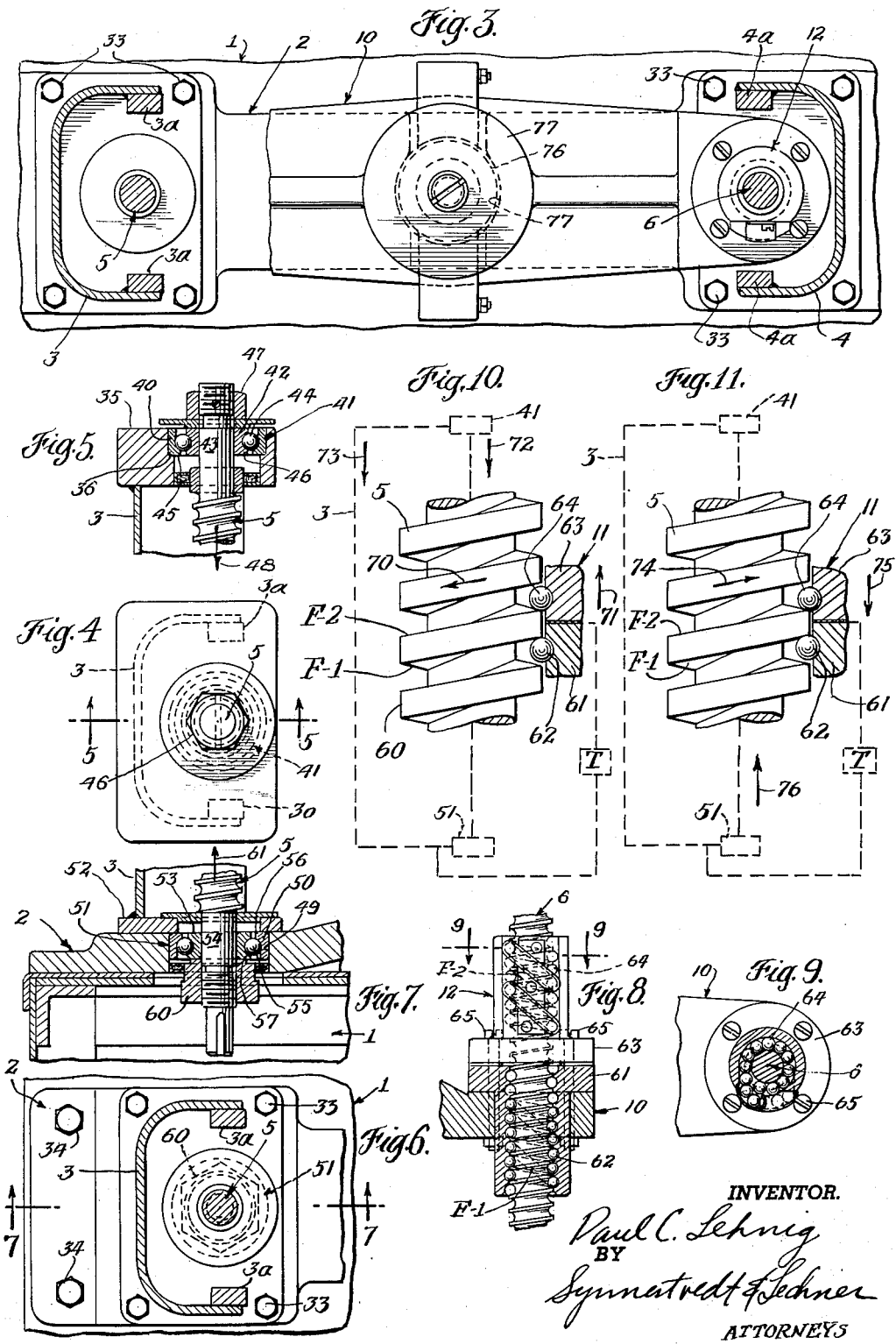
INVENTOR.
Paul C. Lehnig
BY
Synnestvedt & Lechner
ATTORNEYS

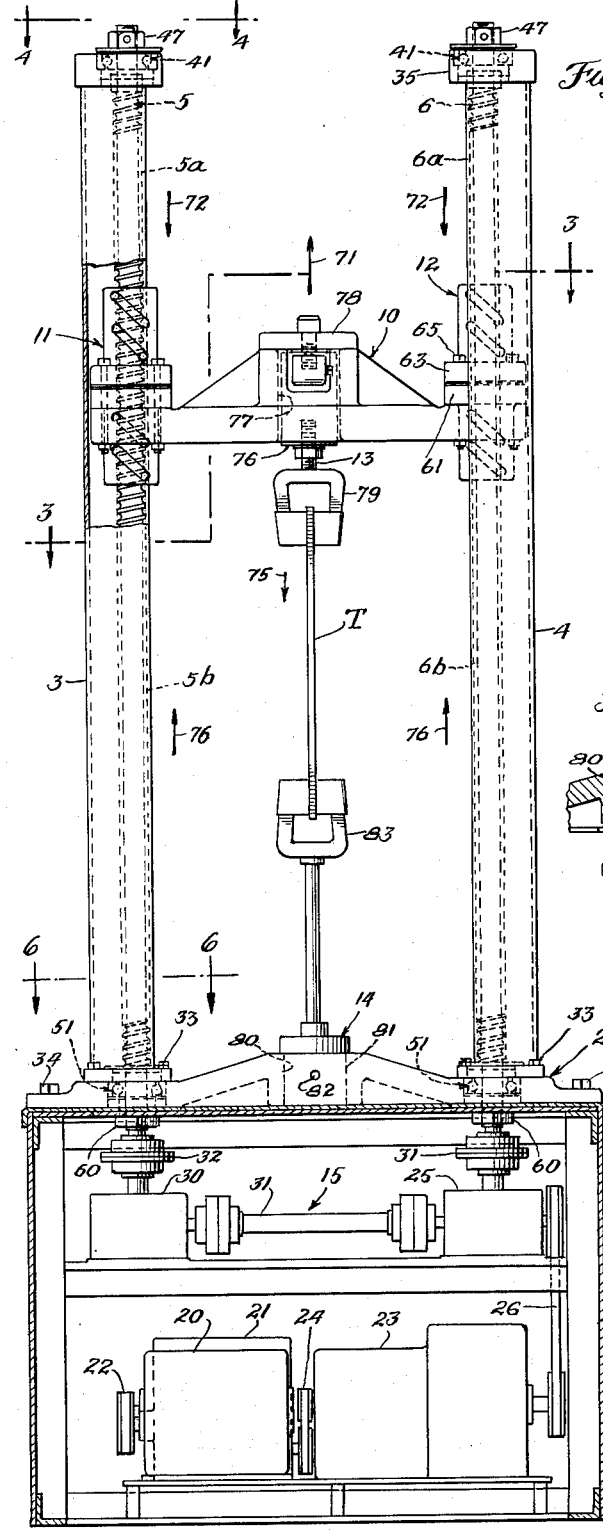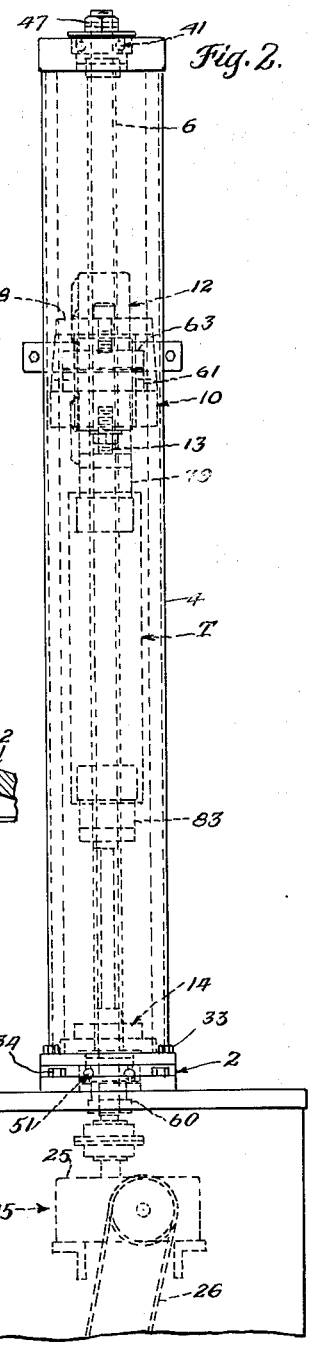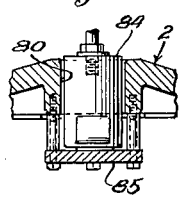

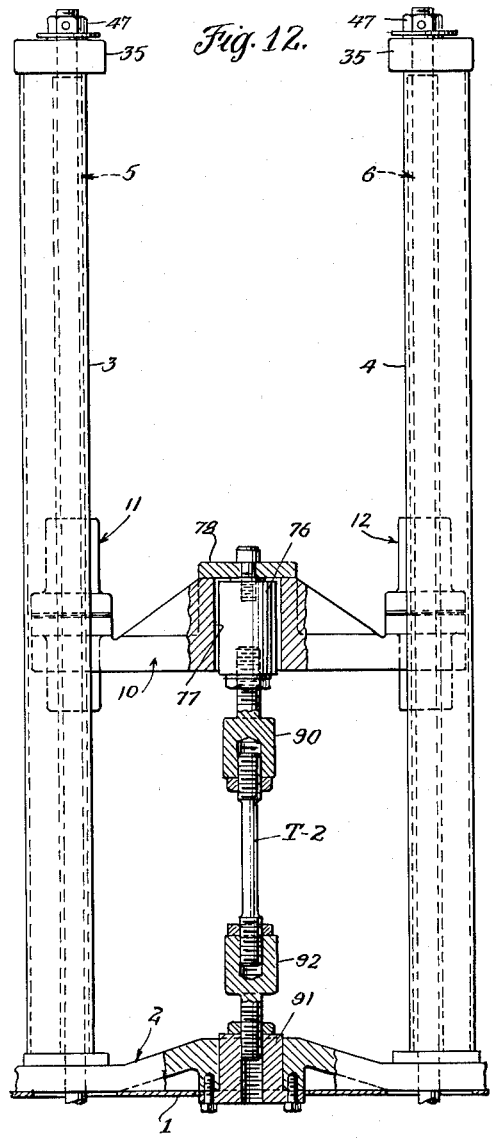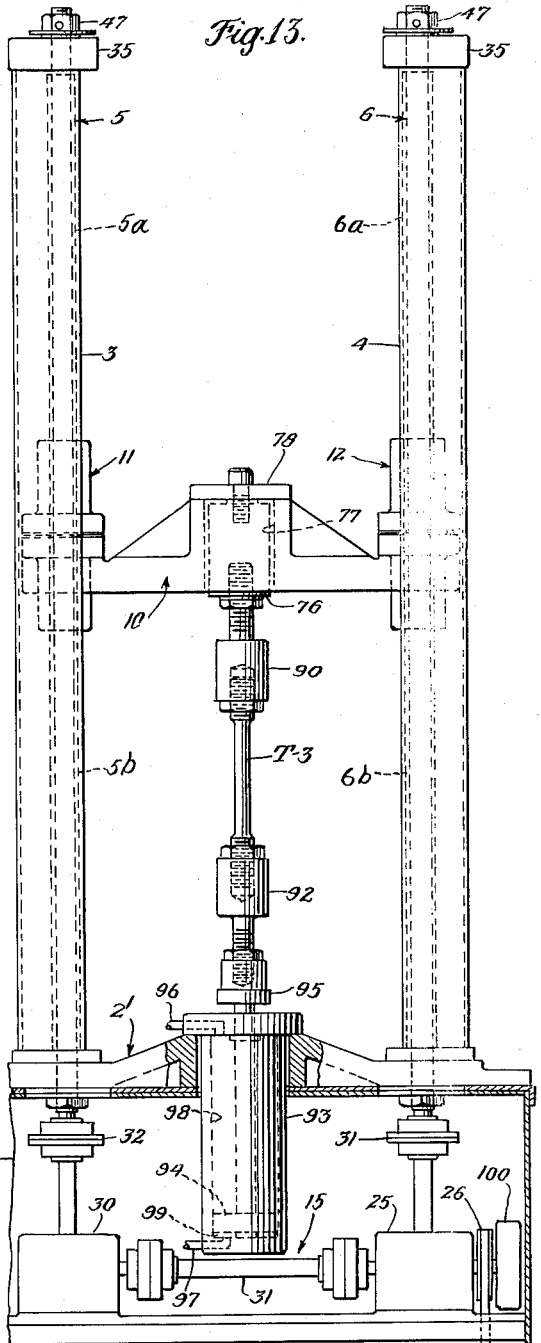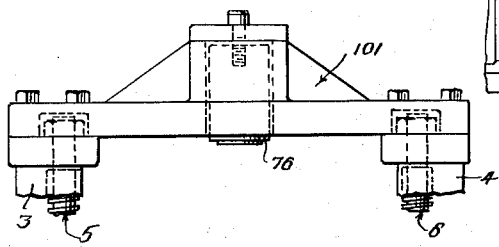

United States Patent Office 3,203,232
Patented Aug. 31, 1965

3,203,232
TESTING MACHINES
Paul C. Lehnig, Jr., North Wales, Pa., assignor to Tinius Olsen Testing Machine Company, Willow Grove, Pa., a corporation of Pennsylvania
Filed Feb. 8, 1963, Ser. No. 257,283
27 Claims. (Cl. 73—93)

This invention relates to universal testing machines for testing materials in tension, compression, and the like. More particularly, the invention relates to a single test area machine having improved loading or straining structure possessing certain advantages and features which enhance the quality or accuracy of tests, eliminates lost motion in tension-compression cycling and provide for faster and highly precise straining and loading rates.

In one aspect the invention contemplates a testing machine having a loading structure which, for all practical purposes, is deflection and lost motion free and provides for the accurate application of various types of test loads such as the application of tensile or compression forces to a test specimen.

In another aspect the invention contemplates a testing machine having a single test area loading structure or frame wherein the load is applied by a movable cross head powered by loading screws, the working portions of which are in tension irrespective of the direction in which load is applied to the specimen.

In another aspect the invention contemplates a testing machine having a single test area loading structure including a pair of cross heads, one of which includes a piston and cylinder to impose the load on the specimen, the cross heads being interconnected by elongated members, the working portions of which are always in tension irrespective of the direction in which load is applied to the specimen.

In another aspect the invention contemplates a single test area testing machine including a frame and a loading cross head supported by a plurality of drive screws, the rotation of which moves the cross head toward and away from the frame so as to apply tensile or compressive forces to a specimen supported between the frame and the cross head, together with thrust bearing structure connecting the screws to the frame and providing means effecting transfer of load reaction between the frame and the screws so that the screws are in tension when the specimen is loaded in compression or in tension and further including nut means connecting the cross head to the drive screws, the nut means and the thrust bearing structure being arranged to eliminate lost motion even upon load reversal.

In another aspect the invention contemplates a single test area machine having a loading frame including a plurality of elongated, channel-shaped columns and a loading cross head powered by drive screws rotatably supported in the columns, together with bearing structure connecting the screws to the frame and providing means effecting transfer of load reaction between the frame and the screws so that the screws are put in tension when the specimen is loaded in compression or is loaded in tension.

In another aspect the invention contemplates a testing machine having a loading frame including channel-shaped column structure adapted to rotatably support an elongated, cross head-drive screw, together with bearing means interconnecting the screw and the column providing for transfer of load reaction between the column and the screw, and the column having a mass distribution providing that the neutral axis of the column lies along the rotational axis of the screw.

In another aspect the invention contemplates a testing machine having a loading frame including column structure adapted to rotatably support an elongated, cross head loading screw, together with bearing means interconnecting the screw and the column providing for transfer of load reaction between the column and the screw, the column being channel shaped and having relatively thick edges so that the mass distribution causes the neutral axis of the column to lie along the rotational axis of the screw.

Testing equipment embodying the present invention will be described below in connection with the following drawings wherein:

FIGURE 1 is an elevational view partially in section and partially broken away illustrating a testing machine incorporating the invention with a specimen being set up in the machine for testing in tension;

FIGURE 1a is a fragmentary view showing the manner in which a load cell is incorporated in the frame of the machine;

FIGURE 2 is a side elevational view of the machine of FIGURE 1 looking towards the left in that figure;

FIGURE 3 is a view taken along the lines 3—3 in FIGURE 3 and illustrating in particular the structure making up the movable cross head, drive screws and frame column;

FIGURE 4 is a plan view of the top part of the left hand column of FIGURE 1 being taken generally as indicated in the lines 4—4 in FIGURE 1;

FIGURE 5 is a section taken along the lines 5—5 of FIGURE 4 and illustrating in particular the manner in which the top part of the drive screw is attached to the frame column;

FIGURE 6 is a plan view of the bottom part of the left hand column of FIGURE 1 being taken generally along the lines 6—6 in FIGURE 1;

FIGURE 7 is an elevational view taken along the lines 7—7 in FIGURE 6 and illustrating in particular the manner in which the lower part of the drive screw is attached to the frame;

FIGURE 8 is an enlarged fragmentary view illustrating the structure of the ball bearing nuts which secure the movable cross head to the drive screws;

FIGURE 9 is a view taken along the lines 9—9 in FIGURE 8;

FIGURE 10 is a diagrammatic view to illustrate how the tension forces on the drive screw are develeoped when the specimen is loaded in tension;

FIGURE 11 is a diagrammatic view to illustrate how the tension forces on the drive screw are developed when the test specimen is loaded in compression;

FIGURE 12 is an elevational view of the machine of FIGURE 1 with certain portions removed and with the test specimen set up for push-pull type testing;

FIGURE 13 is a view of the machine of FIGURE 1 wherein the frame has been modified to incorporate a double acting piston for use in push-pull testing; and FIGURE 14 is a fragmentary view of the frame of FIGURE 1 wherein the frame columns are capped by a fixed cross head.

In FIGURE 1, the frame of the machine includes the base member 1 which is generally rectangular in shape, a cross head 2 fixed to the base and a pair of vertically extending columns or side members which are disposed adjacent opposite ends of the cross head and extend upwardly generally parallel one another. As best shown in FIGURE 3, the columns 3 and 4 are channel shaped. Within the channels are the drive screws 5 and 6. As will be explained in detail later, the drive screws are rotatably interconnected with the frame. A movable cross head 10 extends between the drive screws and is connected with the screws by the nuts 11 and 12. The cross head 10 has means 13 for supporting a test speciment T and the frame has means 14 on the cross head 2 for supporting the specimen T. In FIGURE 1 the specimen T is set up for tension testing.

The screws 5 and 6 are adapted to be simultaneously rotated by means of the conventional drive system 15. The drive system 15 comprises an electric motor 20 which drives a torque amplifier 21 (disposed in back of the motor) through a pulley and belt arrangement 22. The torque amplifier drives a gear system within the gear box 23 by means of a pulley-belt system 24. The output of the gear box 23 is connected to a speed reducer 25 by means of the belt-pulley arrangement 26. The speed reducer 25 is connected to a similar speed reducer 30 by the coupling-shaft arrangement 31. The speed reducer 25 is connected to a coupling 31 splined to the drive screw 6. The speed reducer 30 is connected to a coupling 32 which is splined to the drive screw 5.

As indicated in FIGURE 1, the columns 3 and 4 are connected to the frame cross head 2 by the screws 33 and the cross head 2 is connected to the base by the screws 34. By loosening the screws 33 and 34, the cross head 2 and columns 3 and 4 may be removed from the base as a unit. The couplings 31 and 32 being of the spline type permit the drive screws 5 and 6 to be quickly disengaged from the drive system 15.

The modular frame construction permits the base 1 to be used with a different type of column and cross head structure, for example, a smaller or larger structure. This also permits the cross head and column structure shown to be used with a different type of base, for example, a base having a drive system which is different from the kind shown.

As mentioned heretofore, the concept of mounting the cross head drive screws so that the screws are subjected to tension forces for both compressive and tensile loads on the specimen is an important part of the invention and this will be described below. Under such loading conditions the screws can be considered as load columns.

Since the screws 5 and 6 are identical, the following description will only be in connection with the screw 5.

With reference to FIGURE 5, it will be seen that the column 3 has a cap 35 formed with an annular shoulder 36 which supports the outer race 40 of a pair of axial thrust bearings 41. The inner race 42 is disposed on the end 43 of the screw 5. The ball bearings 44 engage an annular shoulder 45 on the outer race and an annular shoulder 46 on the inner race. A nut 47, threaded on the end 43 of the screw 5, bears on the inner race. The inner race 42 and the ball bearings 44 are in effect an end plate on the screw or load column which engages the shoulder or surface 46 on the frame.

With the above structure, it will be noted that if the screw 5 were subjected to a force to move the same downwardly (as indicated by the arrow 48), the reaction path would be through the screw 5, nut 47, inner race 42, ball bearings 44 and shoulder 45 on the outer race and thence to the column 3. In other words, there would be a transfer of reaction as between the screw and the column so that the end of the screw would be held fixed (axially) and the body of the screw would be put in tension.

If a reverse force were placed on the screw, i.e., the direction move the same upwardly, the screw, nut and inner race would simply slide out of the outer race and the bearing would not effect a transfer of load reaction between the screw and the column.

The bottom part of the screw is similarly arranged as shown in FIGURE 7. In that figure the cross head 2 has an aperture 49 within which is disposed the outer race 50 of the axial thrust bearings 51. The outer race bears against the foot plate 52 of the column 3. The inner race 53 is disposed on the end 54 of the screw 5. The ball bearings 55 bear on the shoulder 56 in the outer race and the shoulder 57 on the inner race. A nut 60 is threaded on the end 54 and bears against the inner race 53. By tightening the nuts 47 and 60, the bearings 41 and 51 can be preloaded. This preloading eliminates lost motion as between the screw and the frame and this is of advantage particularly in load reversal situations.

In connection with FIGURE 5, it will be observed that the respective shoulders on the outer races of the top and bottom bearings 41 and 51 extend around the apertures accommodating the bearing and the screws and also face away from each other and from the frame.

If a force is applied to the screw 5 in a vertical direction or as indicated by the arrow 61, it will be seen that the reaction path is through the screw 5, the nut 60, the inner race 53, the ball bearings 55, the shoulder 56 on the outer race and thence to the frame cross head 2. With the application of this force, the screw is put into tension. If the direction of the force 61 were reversed, it will be seen that there would be no transfer of load reaction as between the frame and the screw because the screw, inner race, and ball bearings 55 would simply move downwardly or out of the outer race.

From the foregoing description, it will be apparent that if a force is exerted on the screw 5 to pull the same downwardly, the top bearings 41 come into play and cause a reaction between the screw and the frame so that the top part of the screw is held fixed and the screw therefore is put into tension. On the other hand, if a force is exerted on the screw to move the same upwardly, the bottom bearings 51 come into play and there is a transfer of load reaction between the screw and the frame so that the bottom part of the screw is fixed and therefore the screw is put into tension.

The above-mentioned forces are developed when the screws are rotated. The rotation causes the nuts 11 and 12 and the cross head 10 to move and this movement is restrained by the reaction between the specimen T and the frame.

The screws 5 and 6 and nuts 11 and 12 are of the ball bearing type. The ball bearing type is preferred because friction and wear are reduced to a minimum. Each nut is comprised of two parts the details of which are shown in FIGURES 8 and 9 for the nut 12. The two parts are set up so that their respective ball bearings bear on opposite faces of the screw thread. In FIGURE 8, the lower part 61 has the ball bearings 62 which bear against the face F–1. The upper part 63 has ball bearings 64 which bear against the opposite face F–2. The nut is fixedly attached to the cross head 10 as by, for example, the nuts and bolts 65. By having the upper and lower nuts preloaded respectively against the opposite faces of the screw thread, lost motion or back lash is eliminated even on load reversal.

In FIGURES 10 and 11 I have somewhat diagrammatically illustrated the manner in which the screws are put into tension irrespective of the type of loading on the specimen. A square thread is used simply for the sake of clarity. In FIGURE 10, assume that the screw 5 is rotating in the direction shown by the arrow 70. The ball bearings 64 will be in contact with the face F–2 on the thread 60. As the screw is rotated, the face F–2 tends to raise the nut 11 (and cross head 10) upwardly as indicated by arrow 71. Since the motion of the nut is restrained by the specimen, a pulling effect is exerted on the screw. This is resisted by the upper bearings 41 and the screw is put into tension as indicated by arrow 72. The transfer of load reaction as between the screws and the frame puts the columns into compression. This is indicated by arrow 73.

In FIGURE 11 the direction of rotation of the screw is reversed or as shown by the arrow 74. The ball bearings 62 on the lower nut 61 are in engagement with the face F–1. As the screw is rotated, the face tends to move the nut and cross head down as indicated by arrow 75. This motion is resisted by the specimen. There is a pulling force exerted on the screw which is resisted by the lower bearing 51. The screw then is put into tension as indicated by arrow 76.

It will be observed that the motion of the screw above the nut 63 is unloaded so that there is no transfer of reaction to the frame column. The columns, therefore, are unloaded.

With reference to FIGURE 1, the foregoing will be summarized.

In a tension test, the screws are rotated to move the cross head 10 upwardly as indicated by the arrow 71. This puts the sections 5a and 6a of the screws 5 and 6 between the upper bearings 41 and the cross head 10 into tension or as indicated by the arrows 72. When the specimen is tested in compression, the screws are rotated to move the cross head downwardly as indicated by the arrow 75. This puts the lower sections 5b and 6b of the screws into tension as indicated by the arrows 76.

The structure which provides for placing the screw in tension irrespective of whether the specimen is being loaded in tension or compression is of importance because the tension forces militate against any tendency for the screw to buckle and consequently this eliminates the screw being a producer of eccentric or off-center loads. By eliminating such loading errors, the loading range of the machine is extended. This is particularly significant in extending the low range because there are no errors to mask out or seriously effect the true load desired to be applied to the specimen.

As mentioned above, when the specimen is loaded in tension, the columns 3 and 4 are loaded in compression. The structure of the columns is such to negate any undesirable effects that may arise due to this type of loading, for example, a buckling which could have the effect of causing distortion of the screws or impose off-set loads on the specimen. The design features in the columns which render the same substantially buckle free are first making the same channel shaped, second having the channel encompass a relatively large cross sectional area and arranging the mass distribution in each column so that its neutral axis lies substantially along the rotational axis of the associated screw. The arrangement eliminates undesired moment arms as between the bearings and the columns and provides for a stress distribution which is essentially uniform.

In the arrangement shown, the neutral axis of each column is made co-axial with the axis of the screw by way of the strips 3a and 4a which are fixed to the outside edges of the respective channels.

The above described frame arrangement with its loading cross head providing for a single test area is of special advantage in providing for the use of direct weighing means.

The weighing means preferably takes the form of a conventional load cell which is incorporated either in the fixed cross head 2 or the movable cross head 10. In FIGURE 1 a load cell 76 is disposed within an aperture 77 formed in the head and is fastened to a support plate 78 fixed to the head. A pair of tension type grips 79 are connected to the bottom of the load cell and these grips support the specimen T. The lower cross head 2 has an aperture 80 within which is disposed a plug 81 retained in the aperture by the pin 82. The plug 81 supports conventional grips 83 which hold the lower part of the specimen T.

In certain types of tests, it will be understood that it is desirable to place a load cell on the bottom cross head 2 and this is done as shown in FIGURE 1a where it will be seen that the load cell 84 is disposed in the aperture 80 and is held on the cross head by the cap 85.

While not illustrated (in FIGURE 1), tooling or gripping devices for use in compression testing, the manner in which such equipment can be utilized with the machine will be well understood by those skilled in the art.

FIGURE 12 illustrates a typical gripping arrangement as applied to the apparatus of FIGURE 1, wherein the specimen is set up for push-pull testing, that is, where the specimen is alternately subjected to tensile and compression forces.

In FIGURE 12 the load cell 76 supports thread type grips 90 connected to the top part of the specimen T-2. The threaded plug 91 carries the grips 92 which support the lower part of the specimen T-2. As will be apparent the screws can be rotated so as to move the cross head upwardly and apply a tensile load to the specimen and then the screw is reversed in direction to move the cross head 10 downwardly and apply a compressive load to the specimen.

In FIGURE 13, I have shown how the apparatus of FIGURE 1 is modified for high cyclic rate, push-pull testing. In FIGURE 13, the load cell 76 in the cross head 10 supports the grips 90 carrying the specimen T-3. The fixed cross head 2′ has been modified to support a loading unit comprising the cylinder 93 carrying a double acting piston 94, the rod 95 of which supports the grips 92 carrying the lower end of the specimen T-3. Fluid lines 96 and 97 provide for entry and exit of fluid to and from the chambers 98 and 99 in the cylinder.

For making a cyclic test, the chamber 98 is connected to exhaust and the cross head 10 moved upwardly (by rotating the screws) until the piston is about the midpoint of the cylinder. Then, by controlling the fluid in the chambers 98 and 99, compressive and tensile loads are alternately applied to the specimen. It will be observed that when the specimen is loaded in compression, the lower portions 5b and 6b of the screws are put into tension and when the specimen is loaded in tension, the upper portions 5a and 6a are put into tension.

In the arrangement of FIGURE 13 the cross head 10 does not move to load the specimen. It remains fixed in position during the test. It is preferred in this type of arrangement to add a brake such as the brake 100 to the drive system 15 to insure that the screws cannot be moved and the cross head remains in fixed position.

For certain types of test work, it is desirable to use a yoke or cross head located at the top of the columns 3 and 4, for example, in FIGURE 14, the cross head 101 is fixedly secured to the columns 3 and 4 and is formed so as to carry the load cell 76. When the machine of FIGURE 1 is modified with the cross head 101 and a specimen tested between the cross head 101 and the cross head 2 (appropriately modified to hold the specimen), the upper portions of the columns are still put into tension when the movable cross head is moved to apply compressive forces to the specimen and the lower portions are put into tension when the cross head is moved to apply a tension load to the specimen.

As mentioned heretofore, the preloaded ball bearing arrangement for the cross head nuts and the drive screw thrust bearings is of important advantage in eliminating lost motion. Additionally, the ball bearing arrangement is of advantage in that it enhances precise control of cross head motion (hence precise control of the applied load) throughout the full load range of the machine.

I claim:

1. In a testing machine for applying a test load to a specimen: a frame; a cross head; a plurality of rotatable loading screws; nut means connecting the cross head to the loading screws, the rotation of the screws moving the cross head toward and away from the frame for applying test loads to a specimen supported between the frame and the cross head, together with thrust bearing structure respectively connecting opposite ends of the screws to the frame and providing a means to effect transfer of load reaction between the screws and the frame to cause corresponding portions of the screws to be in tension when the cross head is moved to apply a test load to the specimen in one direction and other corresponding portions of the screws to be in tension when the cross head is moved to apply a test load to the specimen in a direction opposite to first said direction.

2. In a testing machine for applying a test load to a specimen:
frame means;
a plurality of elongated, rotatable screws spaced from and extending generally parallel to one another;
a cross head extending between said screws;
nut means respectively connecting said cross head with said screws so that rotation of the screws causes movement of the cross head along the screws;
support means on said frame and support means on said cross head for mounting a test specimen for the application of test loads thereto;
bearing means respectively disposed adjacent corresponding ends of said screws and rotatably connecting the screws with the frame and constructed to provide means to effect transfer of load reaction between the frame and the screws in a direction to cause the section of each screw between the bearing means and the cross head to be in tension when a test load is applied to the test specimen in one direction; and
second bearing means respectively disposed adjacent opposite ends of said screws and rotatably connecting the screws with the frame and constructed to provide means to effect transfer of load reaction as between the screws and the frame in a direction to cause the section of each screw between the second bearing means and said cross head to be in tension when a test load is applied to the test specimen in a direction opposite to first said direction.

3. In a testing machine for applying a test load to a specimen:
frame means;
a plurality of elongated, rotatable screws spaced from and extending generally parallel to one another;
a cross head extending between said screws;
nut means respectively connecting said cross head with the screws so that rotation of the screws causes movement of the cross head along the screws, the movement of the cross head effecting loading of the specimen;
support means on said frame and support means on said cross head for mounting a test specimen for the application of test loads thereto;
bearing means respectively disposed adjacent corresponding ends of said screws and rotatably connecting the screws with the frame and constructed to provide means to effect transfer of load reaction between the frame and the screws in a direction to cause the section of each screw between the bearing means and the cross head to be in tension when a test load is applied to the test specimen in one direction;
a second bearing means respectively disposed adjacent opposite ends of said screws and rotatably connecting the screws with the frame and constructed to provide means to effect transfer of load reaction as between the screws and the frame in a direction to cause the section of each screw between the second bearing means and said cross head to be in tension when a test load is applied to the test specimen in a direction opposite to first said direction; and
means connected to said screws for simultaneously rotating the screws for moving said cross head, rotation of the screws in one direction moving the cross head for applying first said test load and causing tension in first said screw sections and rotation of the screws in the opposite direction moving the cross head for applying second said test load and causing tension in second said screw sections.

4. In a testing machine for applying a test load to a specimen:
frame means including a plurality of elongated, spaced apart columns;
a plurality of rotatable screws respectively disposed adjacent to and extending along said columns;
a cross head extending between said screws;
nut means respectively connecting said cross head with the screws so that rotation of the screws causes movement of the cross head along the screws;
support means on said frame and support means on said cross head for mounting a test specimen for the application of test loads thereto;
bearing means respectively disposed adjacent corresponding ends of said screws and rotatably connecting the screws with the columns and constructed to provide means to effect transfer of load reaction between the columns and the screws in a direction to cause the section of each screw between the bearing means and said cross head to be in tension when a test load is applied to the test specimen in one direction;
second bearing means respectively disposed adjacent opposite ends of said screws and rotatably connecting the screws with the frame and constructed to provide means to effect transfer of load reaction as between the screws and the frame in a direction to cause the section of each screw between the second bearing means and said cross head to be in tension when a test load is applied to the test specimen in a direction opposite to first said direction; and
mechanism connected to said screws for rotating the same.

5. A construction in accordance with claim 4 wherein one of said support means includes a cylinder and a double acting piston mounted in the cylinder together with mechanism connected with the piston and adapted to support the test specimen.

6. In a testing machine for applying a test load to a specimen:
frame means including a plurality of elongated, spaced apart columns;
a plurality of rotatable screws respectively disposed adjacent to and extending along said columns;
a cross head extending between said screws;
nut means respectively connecting said cross head with the screws so that rotation of the screws causes movement of the cross head along the screws, the movement of the cross head effecting loading of the specimen;
support means on said frame and support means on said cross head for mounting a test specimen for the application of test loads thereto;
bearing means respectively disposed adjacent corresponding ends of said screws and rotatably connecting the screws with the columns and constructed to provide means to effect transfer of load reaction between the columns and screws in a direction to cause the section of each screw between the bearing means and the cross head to be in tension and the columns to be in compression when a test load is applied to the test specimen in one direction.
second bearing means respectively disposed adjacent opposite ends of said screws and rotatably connecting the screws with the frame and constructed to provide means to effect transfer of load reaction as between the screws and the frame in a direction to cause the section of each screw between the second bearing means and the frame to be in tension when a test load is applied to the test specimen in a direction opposite to first said direction; and
means connected to said screws for simultaneously rotating the screws for moving said cross head, rotation of the screws in one direction moving said cross head for applying first said test load and causing tension in first said screw sections and rotation of the screws in the opposite direction moving said cross heads for applying second said test load and causing tension in second said screw sections.

7. In a testing machine for applying a test load to a specimen:
frame means including an elongated column;
a rotatable screw disposed adjacent to and extending along said column;
a cross head;
nut means connecting said cross head to said screw so that rotation of the screw causes movement of the cross head along the screw;
support means on said frame and support means on said cross head for mounting a test specimen for the application of test loads thereto;
bearing means disposed adjacent one end of said screw and rotatably connecting the screw with the column and constructed to provide means to effect transfer of load reaction between the column and the screw in a direction to cause the section of the screw between the bearing means and the cross head to be in tension when a test load is applied to the test specimen in one direction;
second bearing means disposed adjacent the opposite end of said screw and rotatably connecting the screw with the frame and constructed to provide means to effect transfer of load reaction as between the screw and the frame in a direction to cause the section of the screw between the second bearing means and said cross head to be in tension when a test load is applied to the test specimen in a direction opposite to first said direction;
means connected with said frame and connected with said cross head and preventing rotation of the cross head when said screw is rotated; and
mechanism connected to said screw for rotating the screw.

8. In a testing machine for applying a test load to a specimen:
frame means including an elongated column;
a rotatable screw disposed adjacent to and extending along said column;
a cross head;
nut means connecting said cross head to said screw so that rotation of the screw causes movement of the cross head along the screw, the movement of the cross head effecting loading of the specimen;
support means on said frame and support means on said cross head for mounting a test specimen for the application of test loads thereto;
bearing means disposed adjacent one end of said screw and rotatably connecting the screw with the column and constructed to provide means to effect transfer of load reaction between the column and the screw in a direction to cause the section of the screw between the bearing means and the cross head to be in tension when a test load is applied to the test specimen in one direction;
second bearing means disposed adjacent the opposite end of said screw and rotatably connecting the screw with the frame and constructed to provide means to effect transfer of load reaction as between the screw and the frame in a direction to cause the section of the screw between the second bearing means and the frame to be in tension when a test load is applied to the test specimen in a direction opposite to first said direction;
means connected with said frame and connected with said cross head and preventing rotation of the cross head when said screw is rotated; and
mechanism connected to said screw for rotating the screw to move said cross head, rotation of the screw in one direction moving said cross head for applying first said test load and causing tension in first said screw section and rotation of the screw in the opposite direction moving said cross head for applying second said test load and causing tension in the second said screw section.

9. In a testing machine for applying a test load to a specimen:
frame means including a fixed cross head and a pair of elongated columns respectively connected to said fixed cross head at opposite ends thereof, each column being channel-shaped in plan with the channels facing one another;
a pair of rotatable screws disposed respectively in said channels;
a movable cross head extending between said screws;
nut means connecting said cross head with the screws so that rotation of the screws causes movement of the cross head along the screw, the movement of the cross head effecting loading of a specimen;
means on said fixed cross head and means on said movable cross head for supporting a test specimen for application of test loads thereto;
bearing means respectively disposed adjacent corresponding ends of said screws and rotatably connecting the screws with said columns and constructed to provide means to effect transfer of load reaction between the columns and the screws in a direction to cause the section of each screw between the bearing means and the movable cross head to be in tension and the columns to be in compression when a test load is applied to the test specimen in one direction;
second bearing means respectively disposed adjacent opposite ends of said screws and rotatably connecting the screws with said frame and constructed to provide means to transfer load reaction as between the screws and the frame in a direction to cause the section of each screw between the second bearing means and said movable cross head to be in tension when a test load is applied to the test specimen in a direction opposite to first said direction; and
mechanism connected to said screws for rotating the screws for moving said cross head, rotation of the screws in one direction moving the cross head for applying first said test load and causing tension in first said screw sections and rotation of the screws in the opposite direction moving said cross head for applying second said test load and causing tension in second said screw sections.

10. A construction in accordance with claim 9 wherein each column has means extending along opposite edges of the mouth of the channel to provide a mass distribution in the column so that the neutral axis of the column lies along the rotational axis of the screw.

11. A construction in accordance with claim 9 wherein said nut means and said screws are the ball bearing type and the respective nut means comprise two parts, the respective ball bearings of which are preloaded on opposite faces of the screw thread and further wherein bearing means are the ball bearing type, the ball bearings of which are preloaded.

12. In a testing machine for applying a test load to a specimen:
frame means;
a pair of elongated members spaced from and extending generally parallel to one another;
a cross head extending between said elongated members;
means connecting said cross head with said members and providing for the cross head to be fixed with respect to the members or movable along the members;
specimen support mechanism on said frame and specimen support mechanism on said cross head for mounting a test specimen for the application of test loads thereto;
first support means respectively disposed adjacent corresponding ends of said elongated members and connecting the members with the frame and constructed to provide means to effect transfer of load reaction between the frame and the members in a direction to cause the section of each member between the first support means and the cross head to be in tension when a test load is applied to the test specimen in one direction; and second support means respectively disposed adjacent opposite ends of said elongated member and connecting the members with the frame and constructed to provide means to effect transfer of load reaction as between the members and the frame in a direction to cause the section of each member between the second support means and said cross head to be in tension when a test load is applied to the test specimen in a direction opposite to first said direction.

13. A construction in accordance with claim 12 wherein one of said specimen support mechanisms includes fluid operated piston and cylinder means for imposing the test load on the test specimen.

14. A construction in accordance with claim 13 wherein first said specimen support mechanism includes said piston and cylinder means.

15. In a testing machine for applying a test load to a specimen:
   frame means;
   an elongated member;
   a cross head;
   means connecting said cross head to said member and providing for the cross head to be fixed with respect to the member or movable along the member;
   specimen support mechanism on said frame and specimen support mechanism on said cross head for mounting a test specimen for the application of test loads thereto;
   first support means disposed adjacent one end of said member and connecting the member with the frame and constructed to provide means to effect transfer of load reaction between the frame and the member in a direction to cause the section of the member between the first support means and the cross head to be in tension when a test load is applied to the test specimen in one direction; and
   second support means disposed adjacent the opposite end of said member and connecting the member with the frame and constructed to provide means to effect transfer of load reaction as between the member and the frame in a direction to cause the section of the member between the second support means and said cross head to be in tension when a test load is applied to the test specimen in a direction opposite to first said direction.

16. In a testing machine for applying a test load to a specimen:
   a pair of elongated members;
   a pair of elongated columns, each column being channel shaped in plan with the channels facing one another, said elongated members being respectively disposed in said channels;
   mechanisms respectively connecting said members to said channels adjacent opposite ends thereof;
   a cross head mounted on said elongated members intermediate the connection points between channels and members, the cross head supporting a specimen during a test; and
   means on each said channel providing a mass distribution in the column so that the neutral axis of the column lies along the axis of the elongated member.

17. A construction in accordance with claim 16 wherein each mechanism interconnecting a channel and an elongated member is constructed to permit axial movement of its elongated member in a direction away from said cross head and prevent axial movement in a direction toward the cross head.

18. In a testing machine for applying a test load to a specimen:
   a pair of elongated members;
   an elongated frame;
   mechanisms at opposite ends of said members respectively connecting said members to said frame;
   a cross head; and
   means mounting the cross head on said elongated members intermediate the connection points between the frame and the elongated members and providing for the cross head to be fixed with respect to the member or movable along the member, the cross head supporting a specimen during a test and each mechanism interconnecting the frame and an elongated member being constructed to permit axial movement of its elongated member in a direction away from said cross head and prevent axial movement in a direction toward the cross head.

19. A construction in accordance with claim 18 wherein said elongated members are screws.

20. In a testing machine for applying a test load to a specimen, the subcombination of:
   an elongated member;
   an elongated frame;
   mechanisms at opposite ends of said member respectively connecting the member to said frame;
   a cross head;
   means mounting the cross head on said elongated member intermediate the connection points between the frame and the elongated member and providing for the cross head to be fixed with respect to the member or movable along the member, the cross head supporting a specimen during a test and each mechanism interconnecting the frame and the elongated member being constructed to permit axial movement of the elongated member in a direction away from said cross head and prevent axial movement in a direction toward the cross head.

21. In a materials testing machine, the combination of:
   a support frame;
   a plurality of load columns;
   a cross head mounted on said columns and movable along the column thereto;
   means operatively connected for gripping a test specimen;
   means operatively connected for applying a load to a test specimen; and
   means mounting said load columns on said frame in such a manner as to preclude the application of compressive forces to said columns by placing said columns in tension during both tension and compression tests.

22. In a materials testing machine, the combination of:
   a support frame;
   a pair of test specimen grippers;
   a loading unit supporting one of said grippers;
   load column means extending through said support frame;
   means supporting the other of said grippers on said load column means and means supporting said loading unit on said support frame; and
   means mounting said load column means on said support frame in such a manner that test loads are transmitted from said load column means to said frame only by tensile forces in said load column means.

23. In a materials testing machine, the combination of:
   a support frame;
   a pair of load columns;
   a crosshead mounted on said columns and adjustable along the columns;
   means respectively on said frame and on said crosshead for gripping a test specimen;
   means operatively connected to one of said test specimen gripping means for applying a load to a test specimen;
   and means mounting said load columns on said support frame in such a manner as to preclude the application of compressive forces to said columns by placing the portions of said columns which transfer load between crosshead and frame in tension during both tension and compression tests.

24. In a materials testing machine, the combination of:
a support frame comprising a pair of upright side members, a yoke member extending across the tops of said side members, and a base member extending across the lower ends of said side members;
a pair of upright load columns disposed between said side members and extending through apertures in said base and yoke members, said load columns being slidable relative to said base and yoke members;
a plurality of end plates mounted on the ends of said columns and engaging upper and lower surfaces of said yoke member and said base member;
a crosshead mounted on said columns and adjustable along the columns;
a loading unit; and
upper and lower test specimen grippers, one of said grippers being operatively connected to said loading unit and the other of said grippers being mounted on one of said crosshead or said base, said loading unit being mounted on the other of said crosshead or said base member.

25. In a materials testing machine, the combination of:
a support frame comprising a base, a yoke above said base and a side frame between said base and said yoke;
a pair of vertically spaced test specimen grippers adapted to support a test specimen for the application thereto of tensile and compressive forces;
a loading unit connected to ene of said grippers and operative to apply a test load thereto;
a pair of parallel, upright load columns that extend through aligned apertures in said yoke and said base and are slidable relative thereto;
said yoke and said base including a plurality of transverse shoulders each surrounding each aperture and facing away from said frame;
said columns having ends that extend outwardly from said frame and beyond said shoulders;
means connecting one of said grippers to said frame and the other of said grippers to said loading column; and
a plurality of end plates connected to the ends of said columns and engaging said shoulders to restrain movement of said ends towards said frame, 26. In a materials testing machine, the combination of:
a support frame comprising a base member, a pair of side members, and a yoke member, connected to form an open-centered, rectangular-shaped structure;
a pair of test specimen grippers;
a loading unit comprising a cylinder and a double acting piston received in said cylinder, said piston being connected to one of said grippers for applying a test load thereto;
a pair of parallel upright load columns disposed between said side members and extending through apertures in said base and yoke members;
a crosshead mounted on said columns and adjustable along the columns;
said loading unit and said other grippers being respectively mounted on said base member and said crosshead; and
end plate means mounted on the ends of said load columns, and engaging upper and lower surfaces of said yoke and base members respectively, for supporting said load columns on said frame.

27. In a materials testing machine, the combination of:
a support frame including a base member and a yoke member spaced above said base member;
a pair of test specimen grippers;
a loading unit supporting one of said grippers;
a pair of upright load columns extending through apertures in said yoke and base members and being slidable relative thereto along their axis;
a crosshead connected to said columns;
said other gripper and said loading unit being mounted respectively on said crosshead and said base member; and
a plurality of end plates each connected to an end of one of said columns and operates to restrain such end against longitudinal movement towards said frame.

References Cited by the Examiner

UNITED STATES PATENTS

| | | | |
|---|---|---|---|
| 2,933,921 | 4/60 | Gloor | 73—93 |
| 3,055,224 | 9/62 | Mac George | 73—93 X |

RICHARD C. QUEISSER, *Primary Examiner.*

JOSEPH P. STRIZAK, *Examiner.*